(12) United States Patent
Hirase (10) Patent No.: US 6,405,962 B1
(45) Date of Patent: Jun. 18, 2002

(54) RETRACTOR FOR USE WITH A SEAT BELT WEBBING

(75) Inventor: Satoshi Hirase, Kanagawa (JP)

(73) Assignee: NSK Autoliv Co., Ltd., Fujisawa (JP)

( * ) Notice: Subject to any disclaimer, the term of this patent is extended or adjusted under 35 U.S.C. 154(b) by 0 days.

(21) Appl. No.: 09/467,380

(22) Filed: Dec. 21, 1999

Related U.S. Application Data

(63) Continuation-in-part of application No. 09/141,622, filed on Aug. 27, 1998, now abandoned.

(30) Foreign Application Priority Data

Aug. 28, 1997 (JP) ............................................... 9-232681

(51) Int. Cl.$^7$ ............................................... B60R 22/28
(52) U.S. Cl. ..................... 242/379.1; 280/805; 280/807
(58) Field of Search ........................ 242/379.1; 280/805, 280/807; 297/472, 475, 478

(56) References Cited

U.S. PATENT DOCUMENTS

| 5,344,095 | A |   | 9/1994  | Frei ............................ 242/374 |
| 5,526,996 | A |   | 6/1996  | Ebner et al. ................. 242/374 |
| 5,722,611 | A | * | 3/1998  | Schmid et al. ....... 242/379.1 X |
| 5,820,058 | A | * | 10/1998 | Hirzel et al. ............. 242/379.1 |

FOREIGN PATENT DOCUMENTS

| JP | 60-87749  | 6/1985 |
| JP | 9-193741  | 7/1997 |
| JP | 9-202210  | 8/1997 |
| JP | 9-202212  | 8/1997 |

* cited by examiner

Primary Examiner—John Q. Nguyen
(74) Attorney, Agent, or Firm—Crowell & Moring LLP

(57) ABSTRACT

A retractor for use with a seat belt webbing, comprising: a retractor base (1); a substantially cylindrical-shaped winding shaft assembly (9) which is rotatably supported on the retractor base (1) and around which a webbing can be wound; a torsion bar (2) to be inserted through a center hole formed in the winding shaft assembly (9) in such a manner that one end thereof is connected to the winding shaft assembly (9) in a mutually unrotatable manner and the other end thereof is connected to a locking member (15) in a mutually unrotatable manner; an emergency lock mechanism (300) which, in a vehicle emergency, connects the locking member to the retractor base to stop the rotation of the torsion bar to thereby prevent the winding shaft assembly from rotating in the webbing pull-out direction thereof, the emergency lock mechanism (300) being structured such that, when the emergency lock mechanism (300) is in operation and also a tensile force acting on the webbing exceeds a given value, the emergency lock mechanism (300) can absorb a shock produced in the body of an occupant by means of the torsional deformation of the torsion bar (2); a slit (3a), (30a) which is formed in the winding shaft assembly and extends in a direction crossing the winding shaft assembly while bypassing the insertion position of the torsion bar; and a large diameter portion (210) being larger in size than a width of the slit and including an loop-shaped end portion of the webbing.

10 Claims, 5 Drawing Sheets

RETRACTOR FOR USE WITH A SEAT BELT WEBBING

This Application is a C-I-P of Ser. No. 09/141,622 filed Aug. 27,1998 abandoned

BACKGROUND OF THE INVENTION

The present invention relates to a retractor (a winding device) for use with a seat belt webbing device and, in particular, to a retractor for use with a seat belt webbing which includes an energy absorbing mechanism using a torsion bar.

Conventionally, as a retractor for use with a seat belt webbing which is used to hold an occupant or the like of an vehicle in a seat safely, there are used many kinds of retractors of an emergency lock type which includes an emergency lock mechanism for locking a retractor physically by means of inertia sensing means capable of responding to sudden acceleration, vehicle collision or sudden deceleration, whereby the vehicle occupant can be restricted effectively and safely.

As a retractor of this emergency lock type, there is known a structure that a cylindrical-shaped bobbin around which a webbing can be wound is formed integrally of light material such as synthetic resin, a light alloy or the like, and a winding shaft serving as a strength member formed of steel material by forging is fitted or inserted into the bobbin and is then rotatably supported on a retractor base, thereby forming a light and high-strength winding shaft assembly.

And, the winding shaft includes lock means structured such that a locking base provided in one end portion thereof can be engaged with the engaging portion of the retractor base in a vehicle emergency to thereby prevent the winding shaft from rotating in the webbing pull-out direction thereof; that is, the winding shaft is structured such that, in a vehicle emergency, the locking base thereof can be engaged with the engaging portion of the retractor base to thereby prevent the winding shaft assembly against rotation in the webbing pull-out direction thereof.

By the way, in a retractor of an emergency lock type structured in the above-mentioned manner, as a fixing structure which is used to fix the base end portion of the webbing to the winding shaft assembly, there is known a fixing structure which is disclosed in Japanese Utility Model Unexamined Publication No. Sho. 60-87749 and the like.

Figure 1:
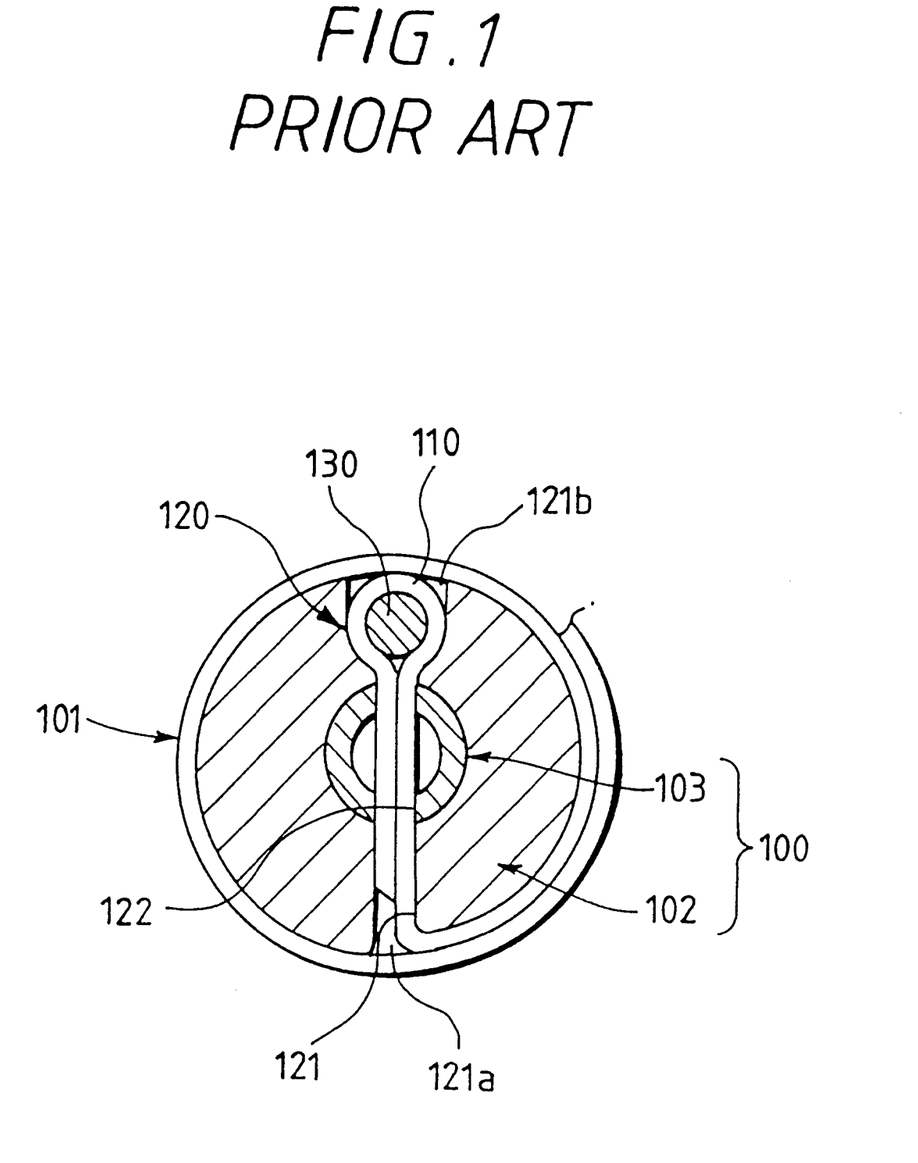
FIG. 1 is a section view of the main portions of a winding shaft assembly employed in a conventional retractor for use with a seat belt webbing, explaining a webbing fixing structure thereof.

In particular, as shown in FIG. 1, a winding shaft assembly 100 includes a bobbin 102 which is formed of light material in an integrally cylindrical shape and around the outer periphery of which a webbing 101 can be wound, and a winding shaft 103 which is formed of steel material and serves as a strength member assembled to the center hole of the bobbin 102. Also, the bobbin 102 and winding shaft 103 respectively include slits 121 and 122 which respectively extend through the bobbin 102 and winding shaft 103 in the diameter directions thereof, so that the base end portion of the webbing 101 can be inserted through the slits 121 and 122.

And, the base end portion of the webbing 101 is inserted from one opening end 121a of the slit 121, is passed through the slit 122, is further passed through the slit 121, and is projected from the other opening end 121b thereof; and, at the same time, a substantially rod-shaped fixing pin 130 having an outside diameter larger than the gap of the two slits is inserted into a loop-shaped portion 110 formed by turning back and sewing the base end portion of the webbing 101 to thereby form a large diameter portion 120, so that the base end portion of the webbing 101 is prevented against the removal from the winding shaft 103. That is, the webbing 101 can be secured to the winding shaft assembly 100.

The above-mentioned fixing structure not only is easy to secure a sufficient fixing strength but also is so simple in structure that it can be assembled easily and efficiently.

On the other hand, in a retractor of an emergency type, when the emergency lock mechanism is operated due to a collision to prevent the webbing from being pulled out, if the shock due to the collision is very heavy, with the passage of time after the collision, a tensile force acting on the webbing increases to thereby cause a sudden deceleration in the body of the vehicle occupant, so that a load given to the occupant from the webbing becomes extremely large. In view of this, recently, there have been proposed various kinds of retractors for use with a seat belt webbing; in particular, each of them includes an energy absorbing mechanism which, when the tensile force acting on the webbing reaches or exceeds a previously set given value, pulls out the webbing a given amount to thereby absorb the shock produced in the body of the occupant, so that the body of the occupant can be protected more positively.

And, as the retractor for use with a seat belt webbing including the above-mentioned energy absorbing mechanism, there are proposed various retractors (see Japanese Patent Unexamined Publications Nos. Hei. 6-156884, Hei. 7-47923, and the like; each of them comprises a substantially cylindrical shaft assembly around which a webbing can be wound, a torsion bar which can be inserted through the center hole of the winding shaft assembly in such a manner that one end thereof is connected to the winding shaft assembly in a mutually unrotatable manner and the other end thereof is connected to the locking base of the winding shaft assembly in a mutually unrotatable manner, and emergency lock means which, in a vehicle emergency, engages the locking base with the retractor base of the retractor to prevent the rotation of the torsion bar to thereby prevent the winding shaft assembly against rotation in the webbing pull-out direction thereof, whereby, when the emergency lock means is put into operation, if a tensile force acting on the webbing exceeds a previously set given value, then not only the shock energy can be absorbed by means of the torsional deformation of the torsion bar but also the tensile force acting on the webbing can be controlled.

As described above, the structure for absorbing the collision energy by means of the torsional deformation of the torsion bar inserted through the center hole of the winding shaft assembly not only is higher in the freedom of design with respect to the energy absorbing amount and the pull-out amount of the webbing, but also is simpler in structure and is thus more suitable for the reduction of the size of a retractor, when compared with a structure for absorbing the collision energy by means of the plastic deformation of the winding shaft assembly itself, retractor base or the like.

However, in such a webbing fixing structure as shown in FIG. 1, when trying to insert the above-mentioned torsion bar into the center hole of the winding shaft assembly, the torsion bar cannot be inserted because the webbing is in the way. Therefore, for example, as disclosed in the above-cited Japanese Patent Unexamined Publication No. Hei. 6-156884 and the like, there is employed a structure in which the torsion bar is inserted into the cylindrical portion formed by turning back and sewing the base end portion of the webbing to prevent the webbing against removal, thereby being able to secure the base end portion of the webbing to the winding shaft assembly.

However, as a result of this, after the cylindrical portion of the webbing is disposed within an inwardly spreading opening formed in the winding shaft assembly, the torsion bar must be inserted into the present cylindrical portion, which lowers the efficiency of the assembling operation of the winding shaft assembly. Also, if the base end portion of the webbing is pulled in the removing direction thereof due to a tensile force acting on the webbing in a vehicle collision, then a bending force and friction resistance are applied to the torsion bar, which has influences on the energy absorbing load to be deal with by means of the torsional deformation of the torsion bar.

SUMMARY OF THE INVENTION

In view of the circumstances of the prior art, the present invention aims at eliminating the drawbacks found in the above-mentioned conventional retractors. Accordingly, it is an object of the invention to provide a retractor for use with a seat belt webbing which not only can absorb a collision energy by means of a torsion bar inserted through a center hole formed in a winding shaft assembly but also can secure the base end portion of a webbing simply and firmly to the winding shaft assembly.

In attaining the above object, according to the invention, there is provided a retractor for use with a seat belt webbing, comprising:

a retractor base;

a substantially cylindrical-shaped winding shaft assembly which is integraly formed and is rotatably supported on the retractor base and around which a seat belt webbing can be wound;

a torsion bar to be inserted through a center hole formed in the winding shaft assembly in such a manner that one end thereof is connected to the winding shaft assembly in a mutually unrotatable manner and the other end thereof is connected to a locking member in a mutually unrotatable manner;

an emergency lock mechanism which, in a vehicle emergency, connects the locking member to the retractor base to stop the rotation of the torsion bar to thereby prevent the winding shaft assembly from rotating in the webbing pull-out direction thereof, the emergency lock mechanism being structured such that, when the emergency lock mechanism is in operation and also a tensile force acting on the webbing exceeds a given value, the emergency lock mechanism can absorb a shock produced in the body of an occupant by means of the torsional deformation of the torsion bar;

a slit which is formed in the winding shaft assembly and penetratingly extends in a direction crossing the winding shaft assembly while substantially passing an area located outside ann area interrupting an insertion position of the torsion bar;

a large diameter portion being larger in size than a width of the slit and including an loop-shaped end portion of the webbing; and a preventive portion, disposed between the large diameter portion and the torsion bar, for preventing the large diameter portion from moving in a direction approaching the torsion bar, wherein the preventive portion comprises a projecting portion disposed on a surface of the slit that is located near to said torsion bar and projected into a space between the torsion bar and the large diameter portion.

According to the above structure, since the base end portion of a webbing is inserted through a slit formed in a winding shaft assembly and, in the base end portion of the webbing that has passed through and projected from the slit, there is formed a large diameter portion larger in size than the gap of the slit to thereby prevent the webbing base end portion against removal, not only the base end portion of the webbing can be secured to the winding shaft assembly simply and firmly but also the large diameter portion is prevented from interfering with or from being strongly pressed against a torsion bar and thus has no influence on the energy absorbing load due to the torsional deformation of the torsion bar.

In addition, with the above structure, it is possible to prevent the torsion bar from being brought in contact with a seat belt webbing which is drawn from the large diameter portion or reduce an excessive bending force which is generated by the seat belt webbing drawn from the large diameter portion and is then applied to the torsion bar. Preferably, in order that the base end portion of the webbing can be made to adjoin the torsion bar, the slit of the winding shaft assembly may be formed in communication with the center hole of the winding shaft assembly; and, at the same time, in order to be able to prevent the large diameter portion from interfering with the torsion bar due to the tensile force acting on the webbing, a portion of the winding shaft assembly, in which the slit is formed, may be projected in such a manner that it can separate the large diameter portion and the torsion bar from each other.

With use of the above-mentioned structure, since the formation position of the slit can be made to approach to one diameter direction of the winding shaft assembly, the strength of the winding shaft assembly can be secured easily.

In the above-mentioned structure, advantageously, the center hole of the winding shaft assembly is communicated with the slit thereof.

Moreover, in the above-mentioned structure, advantageously the large diameter portion is larger in size than the width of the slit, and is also larger in size than the center hole of the winding shaft assembly.

In the above-mentioned retractor according to the present invention, preferably, the end portion of the slit where the large diameter portion is situated is formed in a recessed portion having a shape substantially corresponding to the large diameter portion.

Further, in the above-mentioned retractor according to the present invention, advantageously, the slit is defined by a pair of surfaces, one of which is located near the torsion bar, and the one is disposed at position apart from the torsion bar by a distance which is not less than a radius of the torsion bar.

In addition, the above-object can also be achieved by a retractor for use with a seat belt webbing, according to the other aspect of the present invention, comprising:

a retractor base;

a substantially cylindrical-shaped winding shaft assembly which is rotatably supported on the retractor base and around which a seat belt webbing can be wound;

a torsion bar to be inserted through a center hole formed in the winding shaft assembly in such a manner that one end thereof is connected to the winding shaft assembly in a mutually unrotatable manner and the other end thereof is connected to a locking member in a mutually unrotatable manner;

an emergency lock mechanism which, in a vehicle emergency, connects the locking member to the retractor base to stop the rotation of the torsion bar to thereby prevent the winding shaft assembly from rotating in a webbing pull-out direction thereof, the emergency lock mechanism being structured such that, when the emergency lock mechanism is in operation and also a tensile force acting on the webbing exceeds a given value, the emergency lock mechanism can absorb a shock produced in the body of an occupant by means of the torsional deformation of the torsion bar;

a slit which is formed in the winding shaft assembly and penetratingly extends in a direction crossing the winding shaft assembly while substantially passing an area located outside an area interrupting an insertion position of the torsion bar; and a large diameter portion being larger in size than a width of the slit and including an loop-shaped end portion of the webbing, wherein the slit is defined by a pair of surfaces one of which has a portion located near the torsion bar and disposed at a position apart from a line passing through the center of the winding shaft assembly and extending in parallel with an slit extending direction by a distance which is substantially equal to a radius of the torsion bar.

Further, the above-mentioned object can be attained by a retractor for use with a seat belt webbing, according to another aspect of the present invention, comprising:

a retractor base;

a substantially cylindrical-shaped winding shaft assembly which is rotatably supported on the retractor base and around which a seat belt webbing can be wound;

a torsion bar to be inserted through a center hole formed in the winding shaft assembly in such a manner that one end thereof is connected to the winding shaft assembly in a mutually unrotatable manner and the other end thereof is connected to a locking member in a mutually unrotatable manner;

an emergency lock mechanism which, in a vehicle emergency, connects the locking member to the retractor base to stop the rotation of the torsion bar to thereby prevent the winding shaft assembly from rotating in a webbing pull-out direction thereof, the emergency lock mechanism being structured such that, when the emergency lock mechanism is in operation and also a tensile force acting on the webbing exceeds a given value, the emergency lock mechanism can absorb a shock produced in the body of an occupant by means of the torsional deformation of the torsion bar;

a slit which is formed in the winding shaft assembly and penetratingly extends in a direction crossing the winding shaft assembly while substantially passing an area located outside an area interrupting an insertion position of the torsion bar;

a large diameter portion being larger in size than a width of the slit and including an loop-shaped end portion of the webbing; and a preventive portion, disposed between the large diameter portion and the torsion bar, for preventing the large diameter portion from moving in a direction approaching the torsion bar, wherein the preventive portion comprises a projecting portion, disposed on a surface of the slit that is located near to the torsion bar and projected into a space between the torsion bar and the large diameter portion, to thereby reduce a bending force which is generated by the webbing projected from the large diameter portion and then applied to the torsion bar.

In the above-mentioned construction, it is preferable that the projecting portion is disposed at a position apart from a line passing through the center of the winding shaft assembly and extending in parallel with an slit extending direction by a distance which is substantially equal to a radius of the torsion bar.

DETAILED DESCRIPTION OF THE PREFERRED EMBODIMENTS

Now, description will be given below in detail of a retractor for use with a seat belt webbing according to an embodiment of the invention with reference to the accompanying drawings.

Figure 2:
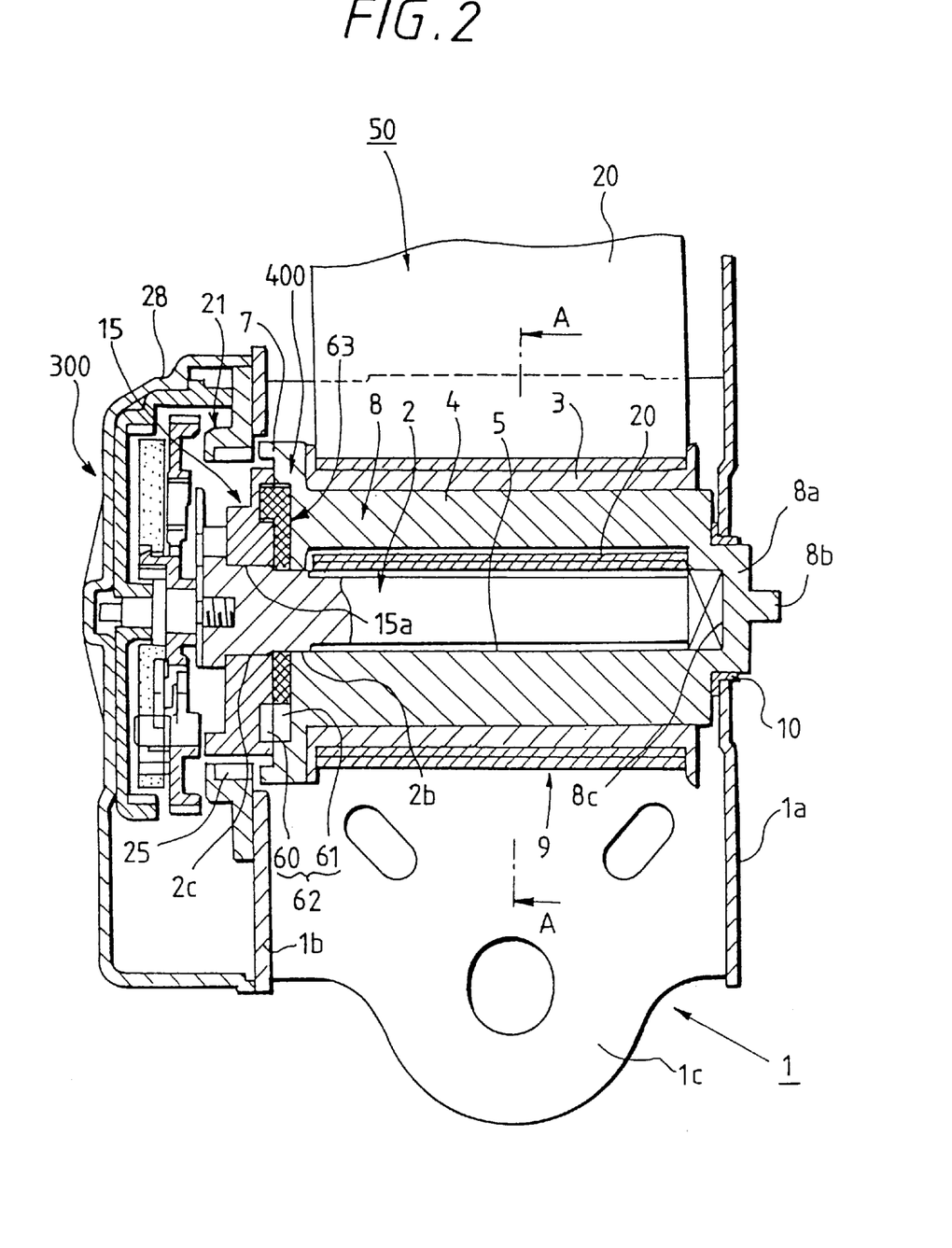
FIG. 2 is a longitudinal front section view of a retractor for use with a seat belt webbing according to a first embodiment of the invention.
Figure 3:
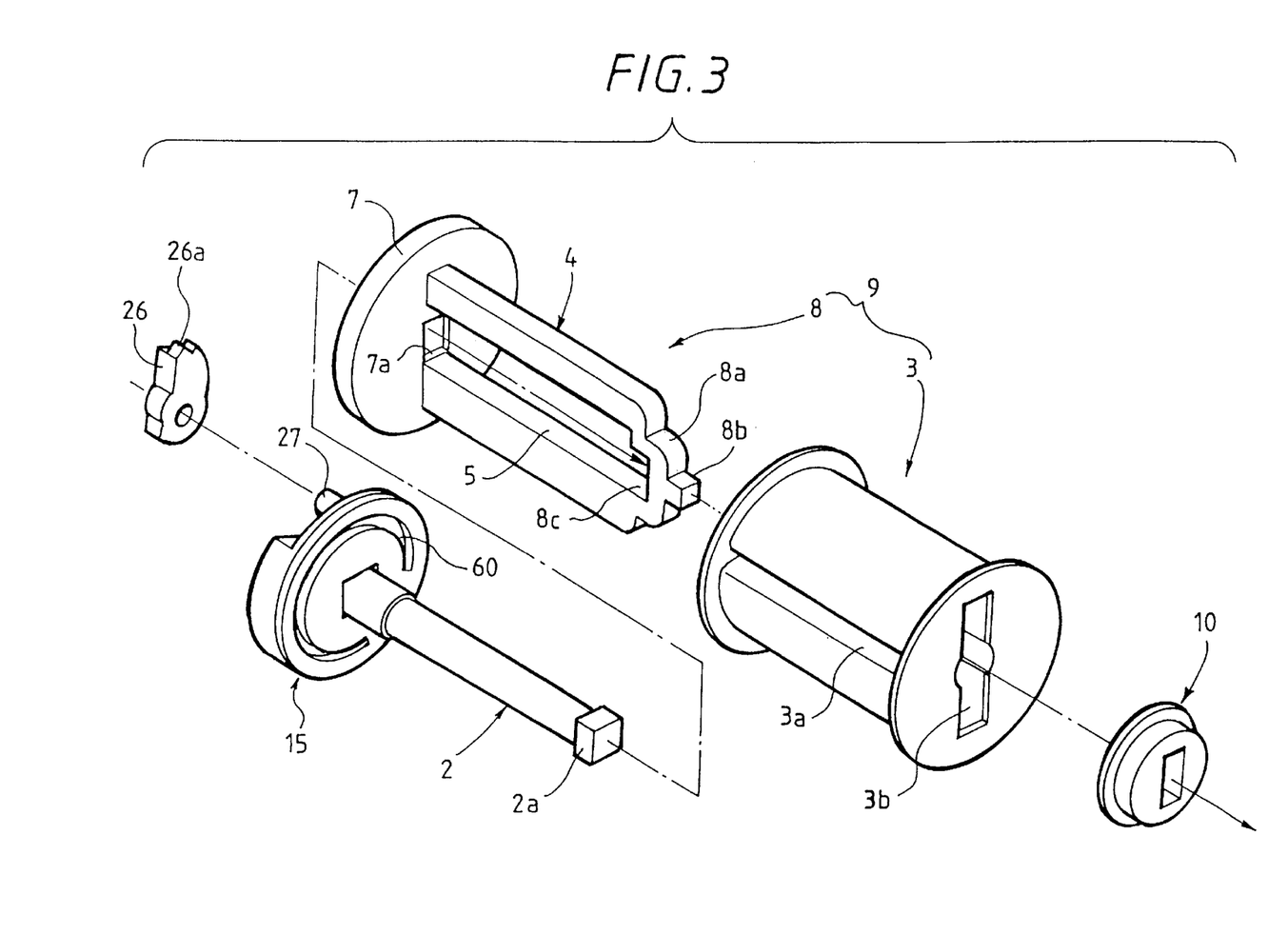
FIG. 3 is an exploded perspective view of the main portions of the retractor for use with a seat belt webbing shown in FIG. 2.
Figure 4:
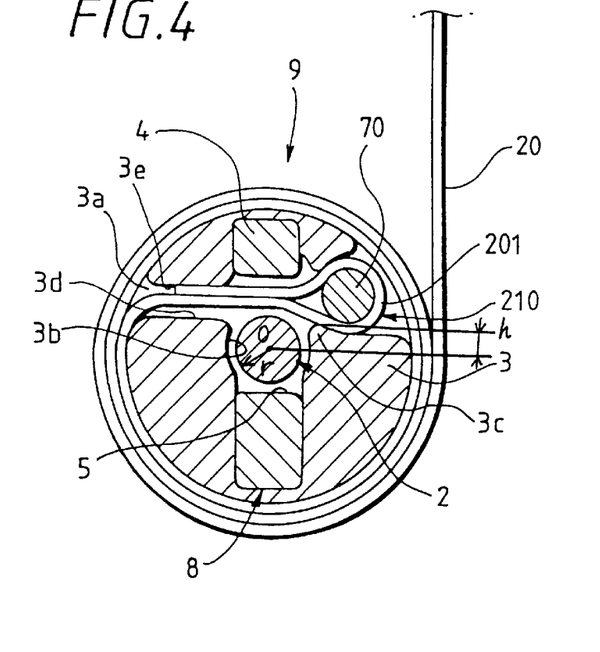
FIG. 4 is a section view taken along the arrow line A—A shown in FIG. 2.
Figure 5:
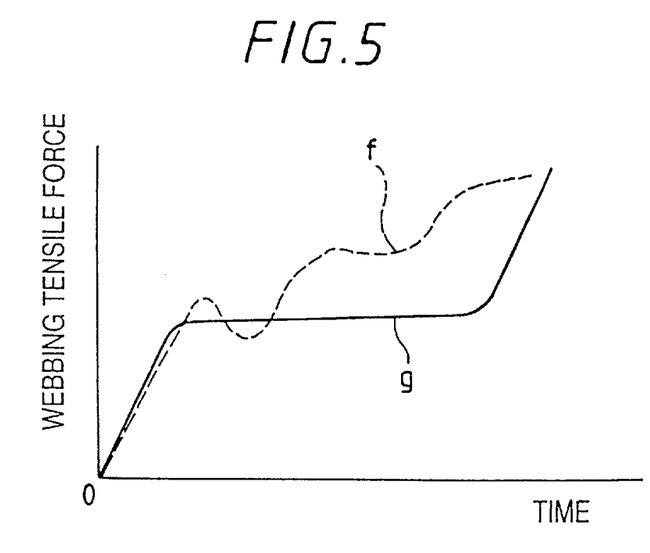
FIG. 5 is an explanatory view of the shock energy absorbing characteristic of the retractor for use with a seat belt webbing shown in FIG. 2 in a vehicle collision.

FIG. 2 is a longitudinal front section of a retractor for use with a seat belt webbing according to an embodiment of the invention; FIG. 3 an exploded perspective view of the main portions of the retractor for use with a seat belt webbing shown in FIG. 2; FIG. 4 is a section view taken along the arrow line A—A shown in FIG. 2; and, FIG. 5 is an explanatory view of the shock energy absorbing characteristic of the retractor for use with a seat belt webbing shown in FIG. 2 in a vehicle collision.

A retractor 50 for a seat belt according to the present embodiment of the invention comprises a substantially cylindrical-shaped bobbin 3 around which a webbing 20 can be wound, a winding shaft 8 serving as a strength member in which a shaft portion 4 thereof suspended down from a base plate 7 thereof disposed opposed to one end side (in FIG. 2, on the left side) of the bobbin 3 is inserted through a center hole 3b formed in the bobbin 3, a torsion bar 2 which is inserted through the center hole 3b of the bobbin 3 and one end of which is connected to the bobbin 3 in a mutually unrotatable manner and the other end of which is connected to a locking base 15 serving as a locking member in a mutually unrotatable manner, and an emergency lock mechanism 300 which, in a vehicle emergency, engages the locking base 15 with a retractor base 1 to stop the rotation of the torsion bar 2 to thereby prevent the bobbin 3 against rotation in the webbing pull-out direction thereof. By the way, in the present embodiment, the bobbin 3 and winding shaft 8 cooperate together in forming a winding shaft assembly 9.

The above-mentioned retractor base 1 is produced by press forming a metal plate in such a manner that it includes right and left side plates 1a and 1b respectively rising from the two sides of a back plate 1*c* to be fixed to a vehicle body, and also it has a substantially U-shaped section.

In the shaft portion 4, there is formed a slit 5 which extends in the axial direction of the shaft portion 4 on the rotary axis of the bobbin 3 so as to be able to secure not only a gap through which the torsion bar 2 can be inserted but also a gap through which the base end portion of the webbing 20 (which will be discussed later) can be inserted. Also, the shaft end 8*a* of the shaft portion 4 is rotatably supported on the side plate 1*a* of the retractor 1 through a bush 10 and, at the same time, in the shaft portion 8*b* of the shaft portion 4 which is projected further from the shaft end 8*a*, there is provided a well-known winding spring device (not shown) which is used to energize the bobbin 3 normally in the webbing winding direction thereof.

Also, in the shaft end 8*a*, there is formed a recessed portion 8*c* having a square-shaped section with which the leading end portion 2*a* of the torsion bar 2 disposed within the slit 5 of the shaft portion 4 can be fitted in a mutually unrotatable manner.

That is, the leading end portion 2*a* of the torsion bar 2 has a rectangular section corresponding to the recessed portion 8*c* and, since the leading end portion 2*a* of the torsion bar 2 is fitted with the shaft end 8*a* of the winding shaft 8, it is connected through the shaft end 8*a* to the bobbin 3 in a mutually unrotatable manner.

The bobbin 3, which cooperates with the winding shaft 8 in forming the winding shaft assembly 9, is integrally formed of light material such as synthetic resin, a light alloy or the like in a substantially cylindrical shape; and, in the barrel portion of the bobbin 3 around which the webbing 20 can be wound, as shown in FIG. 3, in order to allow the base end portion of the webbing 20 to be inserted therethrough, there is formed a slit 3*a* in such a manner that it extends through the present barrel portion in a direction to cross the bobbin 3 (that is, the winding shaft assembly) while bypassing the insertion position of the torsion bar 2. The slit 3*a* is composed of a surface 3*d* located on the near side to the torsion bar 2 and a surface 3*e* located opposed to the surface 3*d*.

The center hole 3*b* of the bobbin 3, which is formed in such a manner that it extends through the bobbin 3 in the rotation axis thereof and the shaft portion 4 can be fitted therewith in a mutually unrotatable manner, has a substantially rectangular cross section and, in the neighboring portion of the center shaft of the bobbin 3, the slit gap width thereof is widened in order to avoid interference with the torsion bar 2.

Further, the slit 3*a* of the bobbin 3 according to the present embodiment is formed in communication with the center hole 3*b* of the bobbin 3 so that the base end portion of the webbing 20 can be made to adjoin the torsion bar 2.

The winding shaft 8 is made of steel material by forging in such a manner that the base plate 7 and shaft portion 4 are formed integrally with each other, and, in the center portion of the base plate 7, there is formed a through hole 7*a* through which the torsion bar 2 can be inserted.

Therefore, after the shaft portion 4 of the winding shaft 8 is fitted into the center hole 3*b* of the bobbin 3, if the bush 10 is fitted over the shaft end 8*a* provided on and projected from the other side (in FIG. 2, the right side) of the bobbin 3, then the assembling of the winding shaft assembly can be completed.

And, the base end portion of the webbing 20 is inserted from one opening end (in FIG. 4, the left opening end) of the slit 3*a* of the bobbin 3, is made to pass through the slit 3*a*, and is projected from the other opening end (in FIG. 4, the right opening end) of the slit 3*a*; and, at the same time, a substantially rod-shaped fixing pin 70 having an outside diameter larger than the gap of the slit 3*a* is inserted into a loop-shaped portion 201 formed by turning back and sewing the base end portion of the webbing 20 to thereby form a large diameter portion 210, so that the base end portion of the webbing 20 is prevented against the removal from the winding shaft 8. That is, the webbing 20 can be secured to the winding shaft assembly 9.

Further, in the other opening end of the slit 3*a*, in more particular, on the surface 3*d* thereof located near to the torsion bar 2, in order to prevent the large diameter portion 210 from interfering with the torsion bar 2 or from being strongly pressed against the torsion bar 2 due to a tensile force acting on the webbing 20, there is provided a projecting portion 3*c* which forms a portion of the bobbin 3, in which the slit 3*a* is formed, as well as serves as a preventive portion in such a manner that it can separate the large diameter portion 210 and torsion bar 2 from each other. The protruding height h of the projecting portion 3*c* is set to be substantially equal to the radius r (that is, the height h is set to be the closest possible value to a half of the diameter) of torsion bar 2, where the height h is the shortest distance between the tip end of the projecting portion 3*c* and a line which contains the axial center of the torsion bar 2 and extends in parallel with an extending direction of the slit 3*a*. On the side where the large diameter portion 210 of the slit 3*a* is situated, there is formed a recessed portion which corresponds in shape to the large diameter portion 210, thereby preventing the large diameter portion 210 from projecting from the outer periphery of the bobbin 3.

On the other end portion of the torsion bar 2, there is provided a locking base connecting portion 2*c* which can be connected to the locking base 15 in such a manner that they can be rotated integrally with each other. For this reason, for example, when the emergency lock mechanism 300 is in operation, if the tensile force acting on the webbing 20 exceeds a previously set given value, then a torsion torque of a given value or higher is applied across the torsion bar 2 to thereby cause the torsion bar 2 to deform, which not only can absorb the collision energy acting on the occupant but also can control the tensile force acting on the webbing 20.

By the way, in the present invention, as the concrete structure of the emergency lock mechanism 300 which, in a vehicle emergency, prevents the locking base 15 from rotating in the webbing pull-out direction thereof, there can be employed various known structures. For example, in the case of the present embodiment, as shown in FIG. 3, on the support shaft 27 of the locking base 15, there is rotatably journaled a pawl 26 which includes a securing tooth 26*a* in the leading end portion thereof. Also, on the outside of the through hole formed in the side plate 1*b*, there is provided an internal-tooth ratchet 21 including in the inner periphery thereof an engaging tooth 25 with which the securing tooth 26*a* can be engaged.

And, the emergency lock mechanism 300, which is disposed within a sensor cover 28, is structured such that, in a vehicle emergency, it brings the securing tooth 26*a* of the pawl 26 into meshing engagement with the engaging internal tooth 25 of the internal-tooth ratchet 21 to thereby prevent the locking base 15 against rotation in the webbing pull-out direction thereof.

Further, in the portions of the base plate 7 and the locking base 15 that are disposed opposed to each other, there is disposed stopper means 400 which, when the torsion amount of the torsion bar 2 reaches a given amount or more, prevents the winding shaft assembly 9 against rotation in the webbing pull-out direction thereof.

The stopper means 400 comprises a C-shaped bottomed guide groove 60 cut formed on the bobbin side end face of the locking base 15, a substantially circular-shaped recessed portion 61 formed in the locking base side end face of the base plate 7, and a lock piece 63 disposed in a guide portion 62 which is formed by the guide groove 60 and recessed portion 61; and, the stopper means 400 is also structured such that, in a range where the lock piece 63 can be slided with respect to the guide groove 60 and recessed portion 61, the lock base 15 and winding shaft 8 can be mutually rotated with respect to each other. By the way, when the torsion bar 2 has a sufficient allowable torsion angle, the vehicle collision is ended before the torsion bar 2 is wrenched off and, therefore, it is not necessary for the stopper means 400 to prevent a given or more degree of torsion of the torsion bar 2.

That is, since the retractor 50 for use with a seat belt webbing according to the present embodiment is structured such that the collision energy is absorbed by means of the torsion bar 2 inserted through the center hole 3b of the bobbin 3, the retractor 50 not only provides a high degree of freedom with respect to the energy absorbing amount as well as to the webbing pull-out amount but also is simple in structure and is thereby suitable for realization of a compact retractor.

And, the slit of the winding shaft assembly 9, which is defined by a gap between the slit 3a and slit 5, is formed in such a manner that it extends through the winding shaft assembly 9 and bypasses the insertion position of the torsion bar 2. Due to this, simply by inserting the base end portion of the webbing 20 through the slit of the winding shaft assembly 9 and inserting the fixing pin 70 into the loop-shaped portion 201, which has been inserted through and projected from the slit of the winding shaft assembly 9, of the webbing 20, the base end portion of the webbing 20 can be secured to the winding shaft assembly 9 simply and firmly, which can facilitate the assembling of the retractor 50.

Also, in the above-mentioned structure, as shown in FIG. 4, in order to prevent the large diameter portion 210 of the webbing 20 from interfering with or being strongly pressed against the torsion bar 2 when the large diameter portion 210 of the webbing 20 is pulled in the removing direction thereof due to the tensile force applied onto the webbing 20 in a vehicle emergency, in the opening end of the slit 3a which is formed on the side where the loop-shaped portion 201 of the webbing 20 is inserted through and projected from, there is projectingly provided the projecting portion 3c in such a manner that it can separate the large diameter portion 210 and torsion bar 2 from each other. This eliminates the possibility that the large diameter portion 210 of the webbing 20 can have influences on the energy absorbing load to be dealt with by the torsional deformation of the torsion bar 2.

Since the projecting portion 3c is provided, the webbing 20 which is protruded from the large diameter portion 210 can be prevented from being brought in contact with the torsion bar 2 and/or even if they are contacted with each other it is possible to reduce an excessive bending force which is to be applied to the torsion bar 2, to thereby suppress an influences on the energy absorbing load to be dealt with by the torsional deformation . Therefore, the slit 3a is formed in communication with the center hole 3b so that the base end portion of the webbing 20 can be disposed in adjacent to the torsion bar 2; that is, the formation position of the slit 3a can be made to approach to one diameter direction of the winding shaft assembly 9. This makes it easy to secure the strength of the winding shaft assembly 9.

Figure 4A:
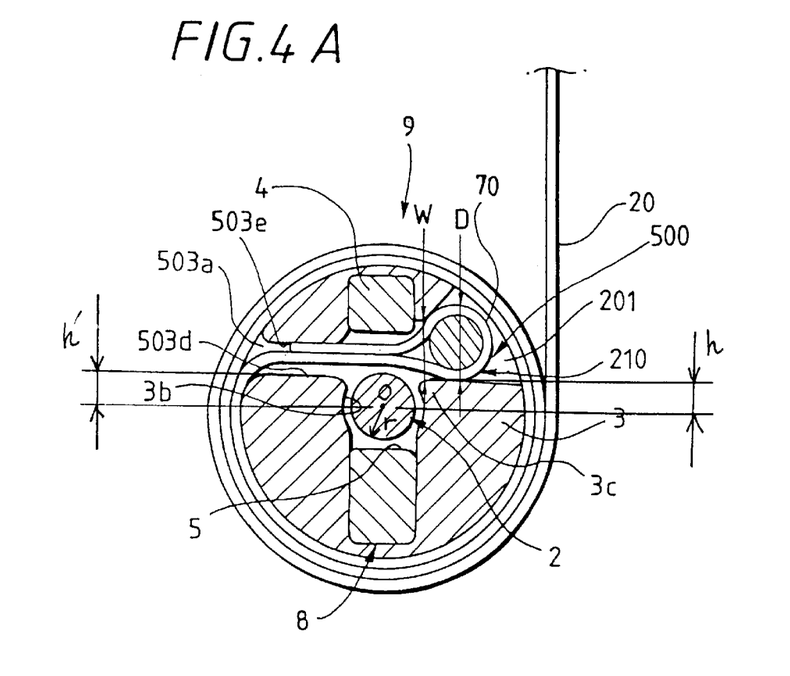
FIG. 4A is a section view taken along the arrow line A—A of a modification of the first embodiment shown in FIG. 2.

Note that although in the above-mentioned embodiment the projecting portion 3c is projected on the torsion bar 2 side of the slit 3a, the use of the projecting portion 3c may be eliminated. As shown in FIG. 4A showing a cross-sectional view of a modification shown in the embodiment, the large diameter portion 210 is disposed and received in a recessed part 500 which is communicated with a slit 503a defined by a straight-shaped surface 503d and a surface 503e opposite to each other. A smallest width W disposed on the recessed part 500 and defined between the straight shaped surface 503d and the surface 503e is made smaller than the outer diameter D of the large diameter portion 210 in such a manner that the large diameter portion 210 is prevented from contacting with the torsion bar 2. That is, in this modification, a recessed part 500 receiving the large diameter portion 210 is shifted upwardly as compared with the embodiment shown in FIG. 4.

Now, FIG. 5 shows two kinds of measured variations in the webbing tensile force in the structure of the retractor 50 for use with a seat belt webbing in a vehicle collision: that is, one kind of measured variations are obtained when the projecting portion 3c is formed in the bobbin 3 to thereby prevent mutual interference between the large diameter portion 210 and torsion bar 2 (a curved line g); and, the other kind of measured variations are obtained when the projecting portion 3c is not formed to allow the large diameter portion 210 to interfere with the torsion bar 2 (a curved line f).

As can be seen clearly from FIG. 5, when the projecting portion 3c is not formed, the large diameter portion 210 interferes with the torsion bar 2 so that, as can be shown by the curved line f, the variations in the webbing tensile force is unstabilized; but, on the other hand, when the projecting portion 3c is formed, as shown by the curved line g, the webbing tensile force can be stabilized so that the shock energy absorption due to the torsional deformation of the torsion bar 2 can be achieved stably and positively.

By the way, in the above-mentioned embodiment, in order to obtain the winding shaft assembly 9 which is light in weight and high in strength, there is employed a structure in which the winding shaft 8 formed of steel material is fitted into the bobbin 3 formed of light material such as resin or the like. However, this is not limitative but, for example, the bobbin 3 and winding shaft 8 can also be formed of a light alloy by die casting into an integrally united body.

Figure 6:
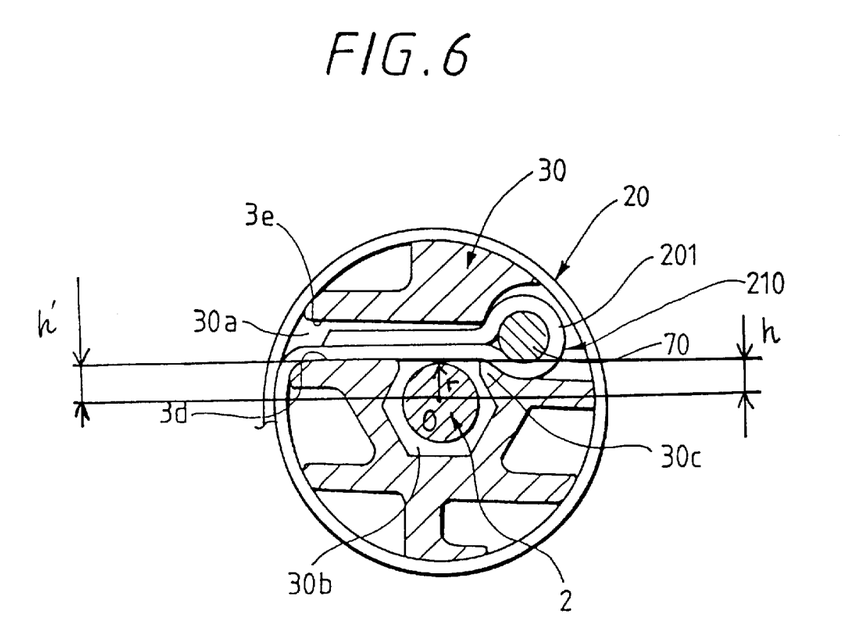
FIG. 6 is a section view of the main portions of another embodiment of a winding shaft assembly employed in the retractor for use with a seat belt webbing shown in FIG. 2.

Now, FIG. 6 shows a winding shaft assembly 30 having a structure that a winding shaft and a bobbin are formed in an integrally united body. In the winding shaft assembly 30, a center hole 30b, which is formed in the winding shaft assembly 30 in such a manner that it extends through the winding shaft assembly 30 in the rotation axis thereof, has a substantially hexagonal cross section.

The surface 3d located on the near side to the torsion bar 2 is large enough in size to prevent mutual interference between the torsionally deforming portion of the torsion bar 2 and the webbing 3, or is large enough in size to reduce an excessive bending force which is to be generated by the webbing 3 and then applied to the torsion bar 2 even if the torsion bar 2 and the webbing 3 are contacted with each other. Namely, the surface 3d is located apart from the rotating center of the winding shaft assembly 30 by a distance h' which is substantially equal to a radius r of the torsion bar 2. Note that the distance h' is the shortest distance between the surface 3d and a line extending in parallel with the slit 30a extending direction and containing an axial center of the torsion bar 2. Also, in the barrel portion of the winding shaft assembly 30 around which the webbing 20 can be wound, in order to allow the base end portion of the webbing 20 to be inserted therethrough, there is formed a slit 30a in such a manner that it extends through the present barrel portion in a direction to cross the winding shaft assembly 30 and bypasses the insertion portion of the torsion bar 2; and, the slit 30a is formed in communication with the center hole 30b so that the base end portion of the webbing 20 can be made to adjoin the torsion bar 2.

A portion defined by connecting the slit 30a and the center hole 30b is directed to a portion of the slit 30a which has a distance smaller than a large diameter portion 201 explained later.

And, the base end portion of the webbing 20 is inserted from one opening end (in FIG. 6, the left opening end) of the slit 30a of the winding shaft assembly 30, is then allowed to pass through the slit 30a and, is further projected from the other opening end (in FIG. 6, the right opening end) of the slit 30a; and, at the same time, a substantially rod-shaped fixing pin 70 having an outside diameter larger than a gap between the two slits is inserted into a loop-shaped portion 201 formed by turning back and sewing the base end portion of the webbing 20 to thereby form a large diameter portion 210, so that the base end portion of the webbing 20 is prevented against removal from the winding shaft 103. That is, the webbing 20 can be secured to the winding shaft assembly 30.

Further, in the other opening end of the slit 30a, in more particular, in order to prevent the large diameter portion 210 from interfering with the torsion bar 2 or from being strongly pressed against the torsion bar 2 due to a tensile force acting on the webbing 20, there is provided a projecting portion 30c which forms a portion of the winding shaft assembly 30, in which the slit 30a is formed, as well as serves as a preventive portion in such a manner that it can separate the large diameter portion 210 and torsion bar 2 from each other.

Therefore, the winding shaft assembly 30 can provide a similar operation effect to the winding shaft assembly 9 according to the previously-described embodiment.

However, a retractor for use with a seat belt webbing according to the invention is not limited to the structures of the winding shaft assembly, torsion bar and emergency lock mechanism and the like which are employed in the above-illustrated embodiments, but, of course, other various structures can also be employed.

For example, in the winding shaft assembly 30 according to the above embodiment, the slit 30a and center hole 30b are made to approach each other to thereby approach the forming position of the slit 30a to the one diameter direction of the winding shaft assembly 30, so that the sufficient strength of the winding shaft assembly 30 can be secured positively. However, this is not limitative but, when the proper selection of the forming material thereof makes it possible to secure the sufficient strength of the winding shaft assembly, the slit through which the base end portion of the webbing may not so formed as to approach the center hole through which the torsion bar is inserted, but the slit and center hole can be formed separately from each other.

Also, a retractor for use with a seat belt webbing according to the invention may also include a pre-tensioner mechanism which, in a vehicle emergency, pulls in the webbing to thereby be able to remove the loosened portion of the webbing.

In a retractor for use with a seat belt webbing according to the invention, since the base end portion of a webbing is inserted through a slit formed in a winding shaft assembly and, in the base end portion of the webbing that has passed through and projected from the slit, there is formed a large diameter portion larger in size than the gap of the slit to thereby prevent the base end portion of the webbing against removal, the base end portion of the webbing can be secured to the winding shaft assembly simply and firmly.

In addition to this, in the retractor according to the present invention, even if the webbing is subjected to a large tensile force, the webbing tensile force can be transmitted to the torsion bar through the loop-shaped portion which is formed by turning back and sewing the base end portion of the webbing together with the rod-shaped fixing pin while the torsion bar is not being subjected to a bending force and also no influence on the energy absorbing load to be dealt with by the torsional deformation of the torsion bar is being given.

Therefore, it is possible to employ a structure which is able to absorb the shock energy by means of the torsion bar inserted through a center hole formed in a bobbin. That is, the retractor not only can provide a high degree of freedom of design with respect to the energy absorbing amount and the webbing pull-out amount but also is simple in structure and is thus suitable for reduction of the size thereof.

While there has been described in connection with the preferred embodiment of the invention, it will be obvious to those skilled in the art that various changes and modifications may be made therein without departing from the invention, and it is aimed, therefore, to cover in the appended claim all such changes and modifications as fall within the true spirit and scope of the invention.

What is claimed:

1. A retractor for use with a seat belt webbing, comprising:
a retractor base;
a substantially cylindrical-shaped winding shaft assembly which is integrally formed and is rotatably supported on said retractor base and around which a seat belt webbing can be wound;
a torsion bar to be inserted through a center hole formed in said winding shaft assembly in such a manner that one end thereof is connected to said winding shaft assembly in a mutually unrotatable manner and the other end thereof is connected to a locking member in a mutually unrotatable manner;
an emergency lock mechanism which, in a vehicle emergency, connects said locking member to said retractor base to stop the rotation of said torsion bar to thereby prevent said winding shaft assembly from rotating in a webbing pull-out direction thereof, said emergency lock mechanism being structured such that, when said emergency lock mechanism is in operation and also a tensile force acting on said webbing exceeds a given value, said emergency lock mechanism can absorb a shock produced in the body of an occupant by means of the torsional deformation of said torsion bar;
a longitudinally disposed slit which is formed in said winding shaft assembly and extending laterally therethrough at a location spaced from said center hole but communicating therewith;
said seat belt webbing extending through said slit and including a loop at one end thereof, said loop comprising a large diameter portion which is larger in size than a width of said slit, said slit terminating at one side thereof at an enlarged longitudinal opening bounded by upper and lower walls, said webbing when under tension, being substantially tangential to said torsion bar; and a preventive portion of one of said walls disposed between said large diameter portion and said torsion bar, to thereby prevent said large diameter portion from moving in a direction approaching said torsion bar, wherein said preventive portion comprises a projecting portion disposed on a surface of said slit that is located near to said torsion bar and projected into a space between said torsion bar and said large diameter portion.

2. A retractor for use with a seat belt webbing as set forth in claim 1, wherein said center hole of said winding shaft assembly is communicated with said slit thereof.

3. A retractor for use with a seat belt webbing as set forth in claim 2, wherein said large diameter portion is larger in size than the width of the slit, and is also larger in size than the center hole of said winding shaft assembly.

4. A retractor for use with a seat belt webbing as set forth in claim 1, wherein the end portion of said slit where said large diameter portion is situated is formed in a recessed portion having a shape substantially corresponding to said large diameter portion.

5. A retractor for use with a seat belt webbing as set forth in claim 1, wherein said slit is defined by a pair of surfaces, one of which has a portion located near said torsion bar and disposed at a position apart from the center of said torsion bar by a distance which is not less than a radius of said torsion bar.

6. A retractor for use in a seat belt as set forth in claim 5, wherein the end portion of said slit where said large diameter portion is situated is formed in a recessed portion having a shape substantially corresponding to said large diameter portion.

7. A retractor for use in a seat belt as set forth in claim 1, wherein said slit is defined by a pair of surfaces, one of which is located near said torsion bar, and said one surface is disposed at a position apart from the center of said torsion bar by a distance which is not less than a radius of said torsion bar.

8. A retractor for use with a seat belt webbing, comprising:

a retractor base;

a substantially cylindrical-shaped winding shaft assembly which is rotatably supported on said retractor base and around which a seat belt webbing can be wound;

a torsion bar to be inserted through a center hole formed in said winding shaft assembly in such a manner that one end thereof is connected to said winding shaft assembly in a mutually unrotatable manner and the other end thereof is connected to a locking member in a mutually unrotatable manner;

an emergency lock mechanism which, in a vehicle emergency, connects said locking member to said retractor base to stop the rotation of said torsion bar to thereby prevent said winding shaft assembly from rotating in a webbing pull-out direction thereof, said emergency lock mechanism being structured such that, when said emergency lock mechanism is in operation and also a tensile force acting on said webbing exceeds a given value, said emergency lock mechanism can absorb a shock produced in the body of an occupant by means of the torsional deformation of said torsion bar;

a longitudinally disposed slit which is formed in said winding shaft assembly and extending laterally therethrough at a location spaced from said center hole but communicating therewith, said webbing when under tension being substantially tangential to said torsion bar;

said seat belt webbing extending through said slit and including a loop at one end thereof, said loop comprising a large diameter portion which is larger in size than a width of said slit, said slit terminating at one side thereof at an enlarged longitudinal opening bounded by upper and lower walls; and wherein said slit is defined by a pair of surfaces one of which has a portion located near said torsion bar and disposed at a position apart from a line intersecting an axis of said torsion bar and also extending in parallel with a slit extending direction by a distance which is substantially equal to a radius of said torsion bar.

9. A retractor for use with a seat belt webbing, comprising a retractor base;

a substantially cylindrical-shaped winding shaft assembly which is rotatably supported on said retractor base and around which a seat belt webbing can be wound;

a torsion bar to be inserted through a center hole formed in said winding shaft assembly in such a manner that one end thereof is connected to said winding shaft assembly in a mutually unrotatable manner and the other end thereof is connected to a locking member in a mutually unrotatable manner;

an emergency lock mechanism which, in a vehicle emergency, connects said locking member to said retractor base to stop the rotation of said torsion bar to thereby prevent said winding shaft assembly from rotating in a webbing pull-out direction thereof, said emergency lock mechanism being structured such that, when said emergency lock mechanism is in operation and also a tensile force acting on said webbing exceeds a given value, said emergency lock mechanism can absorb a shock produced in the body of an occupant by means of the torsional deformation of said torsion bar;

a longitudinally disposed slit which is formed in said winding shaft assembly and extending laterally therethrough at a location spaced from said center hole but communicating therewith;

said seat belt webbing extending through said slit and including a loop at one end thereof, said loop comprising a large diameter portion which is larger in size than a width of said slit, said slit terminating at one side thereof at an enlarged longitudinal opening bounded by upper and lower walls; and a preventive portion of one of said walls disposed between said large diameter portion and said torsion bar, to thereby prevent said large diameter portion from moving in a direction approaching said torsion bar, wherein said preventive portion comprises a projecting portion, disposed on a surface of said slit that is located near to said torsion bar and projected into a space between said torsion bar and said large diameter portion, to thereby reduce a bending force which is generated by the webbing projected from said large diameter and then applied to said torsion bar, said webbing when under tension being substantially tangential to said torsion bar.

10. The retractor for use with a seat belt webbing as set forth in claim 9, wherein said projecting portion is disposed at a position apart from a line intersecting an axis of said torsion bar and also extending in parallel with a slit extending direction by a distance which is substantially equal to a radius of said torsion bar.

* * * * *